(12) United States Patent
Song et al.

(10) Patent No.: US 11,644,887 B2
(45) Date of Patent: May 9, 2023

(54) UNIFIED POWER MANAGEMENT

(71) Applicant: Alibaba Group Holding Limited, Grand Cayman (KY)

(72) Inventors: Jun Song, Tacoma, WA (US); Lin Cheng, Hangzhou (CN); Yijun Lu, Hangzhou (CN); Youquan Feng, Beijing (CN); Zhiyang Tang, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 17/295,009

(22) PCT Filed: Nov. 19, 2018

(86) PCT No.: PCT/CN2018/116141
§ 371 (c)(1),
(2) Date: May 18, 2021

(87) PCT Pub. No.: WO2020/102929
PCT Pub. Date: May 28, 2020

(65) Prior Publication Data
US 2022/0011850 A1    Jan. 13, 2022

(51) Int. Cl.
*G06F 1/329* (2019.01)
*G06F 9/50* (2006.01)
(Continued)

(52) U.S. Cl.
CPC ............ *G06F 1/3287* (2013.01); *G06F 1/329* (2013.01); *G06F 9/5016* (2013.01); *G06F 11/3062* (2013.01)

(58) Field of Classification Search
CPC ...... G06F 1/3287; G06F 1/329; G06F 9/5016; G06F 11/3062; G06F 1/32
See application file for complete search history.

(56) References Cited

U.S. PATENT DOCUMENTS

| 7,831,325 B1 | 11/2010 | Zhang et al. |
| 8,654,691 B2 * | 2/2014 | Anderson ............ H04W 76/28 370/465 |

(Continued)

FOREIGN PATENT DOCUMENTS

| CN | 1766794 A | 5/2006 |
| CN | 105549715 A | 5/2016 |

(Continued)

OTHER PUBLICATIONS

International Search Report dated Aug. 20, 2019, from corresponding PCT Application No. PCT/CN2018/116141, 3 pages.

(Continued)

*Primary Examiner* — Kim Huynh
*Assistant Examiner* — Cory A. Latham
(74) *Attorney, Agent, or Firm* — Lee & Hayes, P.C.

(57) ABSTRACT

System and methods may include receiving a request for assigning resources to a first application associated with a first entity, the first application having a plurality of levels of performance each corresponding to a different power consumption; and determining a particular level of performance of the first application to run on the resource under a first constraint that a sum of a power consumption of the first application running at the particular level of performance and power consumptions of one or more other resources running other applications associated with the first entity is less than or equal to a power budget associated with the first entity.

20 Claims, 10 Drawing Sheets

(51) Int. Cl.
G06F 11/30 (2006.01)
G06F 1/3287 (2019.01)

(56) References Cited

U.S. PATENT DOCUMENTS

| | | |
|---|---|---|
| 2011/0191781 A1 | 8/2011 | Karanam et al. |
| 2015/0022837 A1* | 1/2015 | Kuroishi ............... G06F 1/3231 |
| | | 358/1.14 |
| 2015/0067356 A1* | 3/2015 | Trichy Ravi ............ G06F 1/324 |
| | | 713/300 |
| 2016/0218979 A1* | 7/2016 | Roh ...................... H04L 47/122 |

FOREIGN PATENT DOCUMENTS

| | | | |
|---|---|---|---|
| CN | 106155807 A | 11/2016 | |
| CN | 112016258 A * | 12/2020 | ............. G06F 30/32 |

OTHER PUBLICATIONS

Written Opinion dated Aug. 20, 2019, from corresponding PCT Application No. PCT/CN2018/116141, 3 pages.

* cited by examiner

| Row | Power Budget 302 | Required PERF 304 | Accepted PERF & duration 306 | Desired PERF 308 | Tolerated Latency 310 | Part ID 312 | Workload feature (#cores, #threads, FP, DDR access latency, IO B/W) 314 |
|---|---|---|---|---|---|---|---|
| 1 | 90W | 2.1GHz | 1.8GHz for 20 seconds | 2.5GHz | 10us | #185BC2 | (44, 0.55, 1.20, 50ns, 2.7Gb/s) |
| 2 | 105W | 2.3GHz | 1.2GHz forever | 3.6GHz | 300us | #187EF1 | (44, 0.72, 1.50, 96ns, 5.0Gb/s) |
| 3 | 120W | 2.3GHz | 1.2GHz forever | 3.6GHz | 300us | #187EF2 | (44, 0.72, 1.50, 96ns, 5.0Gb/s) |
| 4 | 130W | 2.5GHz | 2.5GHz | 2.5GHz | 100us | #165CD4 | (32, 0.83, 1.06, 122ns, 3.5Gb/s) |

| Sample ID Index | Power budget 402 | Required PBP per app 404 | Acceptable PBP & duration per app 406 | Desired PBP 408 | Tolerated error per app 410 | Part ID 412 | Workload (cores, app ratio, PC, DDR access latency, IO B/W per app) 414 |
|---|---|---|---|---|---|---|---|
| 1 | 120W | (2.1GHz, 2.1GHz) | (1.8GHz for 20 seconds, 1.6GHz for 30 seconds) | (2.5GHz, 3.0GHz) | (10us, 70us) | #185BC2 | (4, 0.55, 1.10, 5ns, 2.7Gb/s; 8, 0.42, 0.94, 70ns, 0.03Gb/s) |
| 2 | 135W | (2.3GHz, 2.5GHz) | (1.2GHz forever, 1.8GHz for 30 seconds) | (0.6GHz, 2.5GHz) | (300us, 5us) | #187EF1 | (44, 0.72, 1.32, 96ns, 5.0Gb/s; 4, 0.81, 1.09, 52ns, 0.8Gb/s) |
| 3 | 150W | (2.3GHz, 2.5GHz) | (1.2GHz forever, 1.8GHz for 30 seconds) | (0.6GHz, 2.5GHz) | (300us, 10us) | #187EF2 | (44, 0.72, 1.32, 96ns, 5.0Gb/s; 4, 0.81, 1.09, 52ns, 0.8Gb/s) |
| 4 | 160W | (2.5GHz, 3.8GHz) | (2.5GHz forever, 2.5GHz (forever)) | (2.5GHz, 3.8GHz) | (100us, 5us) | #165CD4 | (32, 0.83, 1.06, 122ns, 3.5Gb/s; 4, 0.41, 1.85, 40ns, 1.2Gb/s) |

UNIFIED POWER MANAGEMENT

This Application claims priority to and is a national stage application, filed under 35 U.S.C. § 371, of International Patent Application No. PCT/CN2018/116141, filed on Nov. 19, 2018, which is incorporated herein by reference.

BACKGROUND

A number of different power control methods and mechanisms have been provided for managing power usage and consumption of a system which is able to provide resources. These power control mechanisms control and manage power usage and consumption of a system simultaneously.

Since multiple power control mechanisms attempt to control the power usage and consumption of one or more parts of the system at the same time, conflicts may occur from time to time. For example, one power control mechanism may set a power limit of 300 W for a CPU core, while another power control mechanism may set a frequency limit, for example, 2.5 GHz for the same CPU core. However, the power level of 300 W may not be sufficient for the CPU core to run at 2.5 GHz. In this case, these two power control mechanisms conflict with each other.

In view of the above, it is necessary to provide a method for unified power management that can avoid conflicts among a variety of power control mechanisms.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 illustrates a tracking table for a single application/tenancy.

FIG. 4 illustrates a tracking table for multiple applications/tenancies.

DETAILED DESCRIPTION

Figure 1:
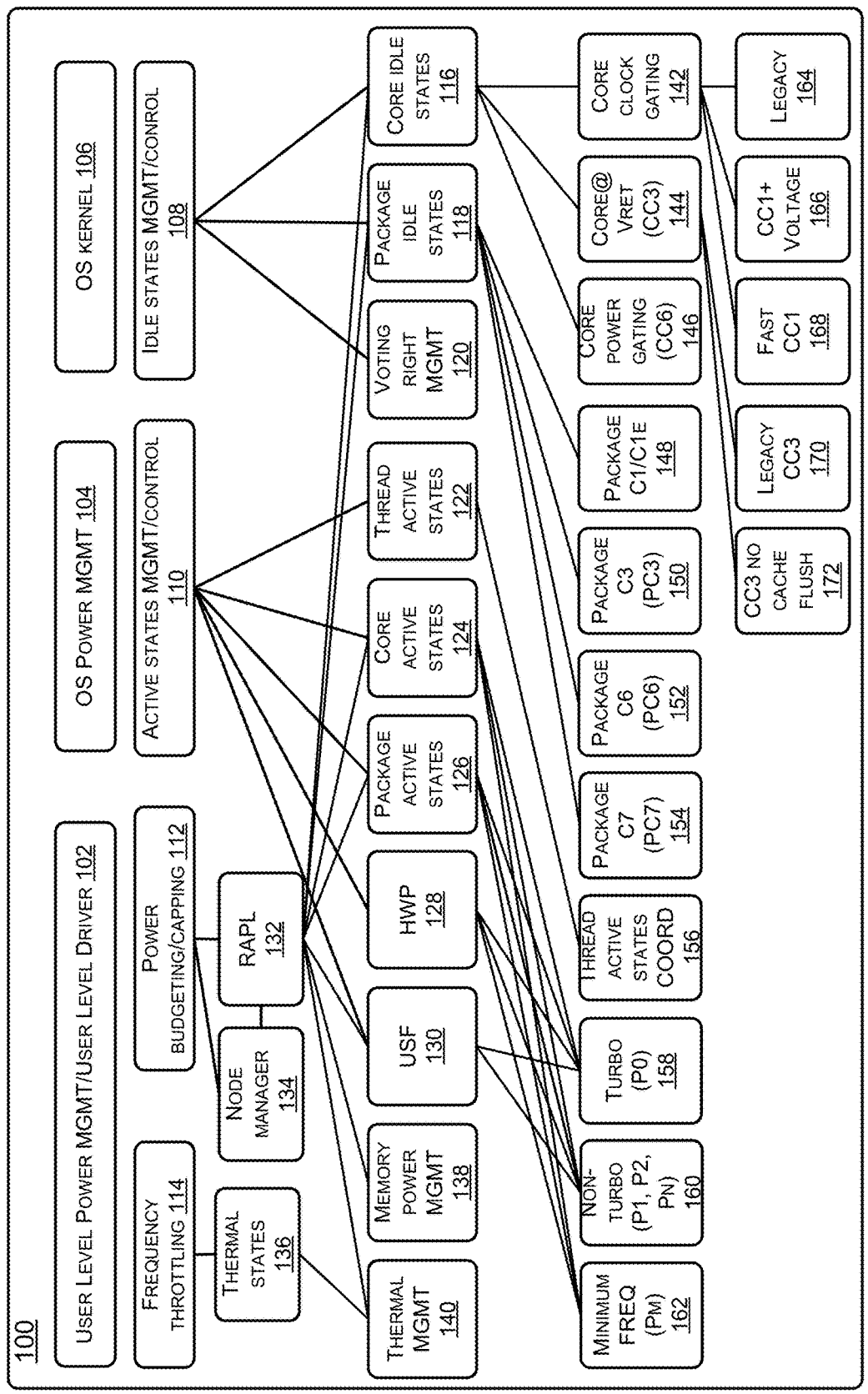
FIG. 1 illustrates an example block diagram of a system including various power management mechanisms.

Systems and processes discussed herein are directed to improving power management, and more specifically to improving power management of resources that consume various amount of power in different states.

Throughout the specification, terminologies may be denoted as follows. Power budgeting/capping refers to setting a power limit/cap for a resource, where power usage or consumption of the resource may not exceed the power limit/cap. Alternatively or additionally, a soft/dynamic threshold, for example, 110%, 120%, 130%, etc., of the power budgeting/capping may be set for the resource to run over the power limit/cap. Alternatively or additionally, a grace period, for example, 20 seconds, 30 minutes, 2 hours, etc., may be set for the resource to go run above power limit/cap.

The resource may include but are not limited to a thread, a CPU core, a package, a socket, a desktop, a mobile terminal, a laptop, a computing system, a server, a Data Center (DC), an Internet Data Center (IDC), etc.

Active states refer to performance/busy states of a resource. The active states may include, but are not limited to, a plurality levels of active states, for example, a zero-level active state, a first-level active state, a second-level active state, an $n^{th}$-level active state, etc. The active states may be defined in terms of percentages of maximum power, percentages of maximum voltage, percentages of maximum frequency, etc. For example, the zero-level active state may correspond to a state of which the power consumption/voltage level/frequency is the maximum power/voltage level/frequency. The first-level active state may correspond to a state of which the power consumption/voltage level/frequency is greater than 90% of the maximum power/voltage level/frequency. A second-level active state may correspond to a state of which the power consumption/voltage level/frequency is between 70% and 90% of the maximum power consumption/voltage level/frequency. An $n^{th}$-level active state may correspond to a state of which the power consumption/voltage level/frequency is between a predetermined lower limit percentage and a predetermined upper limit percentage of the maximum power consumption/voltage level/frequency, etc. The percentages, the maximum power consumption/voltage level/frequency, the predetermined lower limit, and the predetermined upper limit may be determined by, but not limited to, historical data, statistical data, test data, simulation data, etc. P-states defined in Advanced Configuration and Power Interface (ACPI) may be used as examples of the active states. The P-states may be implemented based on Dynamic Voltage Frequency Scaling (DVFS). Enhanced Intel SpeedStep Technology (EIST) may be implemented by Intel as an advanced means of enabling very high performance while also meeting the power-conservation needs of mobile systems.

Idle states refer to states in which at least a part of the resource is shut down. C-states defined in ACPI may be used as examples of the idle states. The idle states may include a plurality levels of idle states, for example, a zero-level idle state, a first-level idle state, a second-level idle state, an $n^{th}$-level idle state, etc., where n may be a positive integer. The idle states may be defined in term of percentages of minimum power, percentages of minimum voltage, percentages of minimum frequency, etc. For example, the zero-level idle state may correspond to a state in which the resource is working, and of which the power consumption/voltage level/frequency of the resource may be a certain percentage, for example, 50% of the maximum power/voltage level/frequency. Additionally or alternatively, this certain percentage (i.e., 50%) may correspond to the lower bound of the active state. The first-level idle state may correspond to a state of which the power consumption/voltage level/frequency of the resource is greater than 40% and less than 50% of the power consumption/voltage level/frequency of the maximum power/voltage level/frequency. The second-level idle state may correspond to a state of which the power consumption/voltage level/frequency of the resource is between 30% and 40% of the power consumption/voltage level/frequency of the zero-level idle state. The $n^{th}$-level idle state may correspond to a state of which the power consumption/voltage level/frequency of the resource is between a predetermined lower limit percentage and a predetermined upper limit percentage of the power consumption/voltage level/frequency of the zero-level idle state, etc. The percentages, the minimum power consumption/voltage level/frequency, the predetermined lower limit, and the predetermined upper limit may be determined by, but not limited to, historical data, statistical data, test data, simulation data, etc.

FIG. 1 illustrates an example block diagram of a system 100 including various power management mechanisms.

Referring to FIG. 1, the system 100 may include the following power management mechanisms. These power management mechanisms may be implemented by, but not limited to, software, hardware, firmware, or any combination thereof.

User level power management (MGMT)/user level driver mechanism 102 may be used to manage the power consumption based on the interaction between a user and a system and/or among different users of the same system.

Operating System (OS) power management (MGMT) mechanism 104 may be used to manage the power of an OS.

OS kernel 106 may be the central part of an OS and manage the operations of the OS.

Idle states management (MGMT)/control mechanism 108 may be used to manage idle states of resources such as threads, cores, packages, sockets, servers, and the like.

The idle states are discussed above. The idle states may be divided into different categories, such as thread idle states, core idle states, package idle states, and the like. Idle states may shut down parts of the thread, the core, or the package when the thread, the core, or the package is unused. Usually, in the idle states, a minimal number of instructions or no instructions are executed. If a thread/core/package is not used for a certain period, the thread/core/package may be put in a thread/core/package idle state.

The idle states may include the zero-level idle state, the first-level idle state, the second-level idle state, . . . , the $n^{th}$-level idle state, where n may be a positive integer. In an order of the first-level idle state, the second-level idle state, . . . , the $n^{th}$-level idle state, the idle states may go deeper/lower with lower power consumption. The zero-level idle state may be the operational/busy state, meaning that the resource is doing useful work. If the resource is in a relatively deeper/lower idle state, for example, the sixth-level idle state, the seventh-level idle state, and the like, the resource may take longer time to exit the idle state.

The resource may be put into an appropriate idle state depending on the usage scenario determination. Usage scenario determination may be made by the idle states management/control mechanism 108 based on the number of interrupts, the tolerance of latency, or any other factors.

For example, the usage scenario determination may be made by the idle states management/control mechanism 108 based on the tolerated latency of an application. The resource running the application which is sensitive to the latency may be put into a relatively shallower/higher idle state, for example, the first-level idle state, the second-level idle state, and the like. If the application running on the resource is not sensitive to the latency, the resource may be put into a relatively deeper/lower idle state, for example, the sixth-level idle state, the seventh-level idle state, and the like. If the application running on the resource has to tolerate latency fluctuation, the resource may enter a relatively shallower/higher idle state, for example, the first-level idle state, the second-level idle state, and the like.

For another example, the usage scenario determination may be made by the idle states management/control mechanism 108 based on the number and/or randomness of interrupts of an application. If the application running on the resource has a great number of interrupts, the resource may be put into a relatively shallower/higher idle state, for example, the first-level idle state, the second-level idle state, and the like. If the application running on the resource has a relatively small number of interrupts, the resource may be put into a relatively deeper/lower idle state, for example, the sixth-level idle state, the seventh-level idle state, and the like. If the application running on the resource has interrupts with high randomness, the resource may be put into a relatively shallower/higher idle state for example, the first-level idle state, the second-level idle state, and the like. If the application running on the resource has predictable interrupts, the resource may be put into a relatively deeper/lower idle state, for example, the sixth-level idle state, the seventh-level idle state, and the like.

Active states management (MGMT)/control mechanism 110 may be used to manage active states of resources such as threads, cores, packages, sockets, servers, and the like.

The active states are discussed above. The active states may be divided into different categories, such as thread active states, core active states, package active states, and the like. The active states may be related to the capability of resources for running the resource at different voltages and/or frequency levels. The active states may include the zero-level active state, the first-level active state, the second-level active state, the $n^{th}$-level active state, etc., where n may be a positive integer. The zero-level active state may be the highest state resulting in maximum performance of the resource. The first-level active state, the second-level active state, the $n^{th}$-level active state, etc. may save some power but at some tradeoff of the performance of the resource. The active states may also be referred as the zero-level idle state.

Power budgeting/capping mechanism 112 may limit how much power the resource may consume.

Frequency throttling mechanism 114 may be used to limit the frequency of resources.

The idle states management/control mechanism 108 may be further used to control core idle states 116, package idle states 118, and voting right management mechanism 120.

The active states management/control mechanism 110 may be further used to control thread active states 122, core active states 124, package active states 126, hardware managed active states (HWP) 128, and uncore frequency scaling (USF) 130. The HWP 128 may control active states of hardware. The USF 130 may control the frequency of the uncore parts such as cache, memory controller, and the like.

The power budgeting/capping mechanism 112 may be further used to control Running Average Power Limit (RAPL) 132 and node manager 134. The node manager 134 may be used to manage servers. The RAPL 132 may be used to set power limits on resources. The node manager 134 may be coupled to the RAPL 132.

The frequency throttling mechanism 114 may be used to control the thermal states 136.

The RAPL 132 may be further used to control core idle states 116, package idle states 118, core active states 124, package active states 126, USF 130, memory power management (MGMT) mechanism 138, and thermal management (MGMT) mechanism 140.

The thermal states 136 may be used to control the thermal management mechanism 140.

The core idle states 116 may include but not limited to core clock gating 142, core at VRET (CC3) 144, and core power gating (CC6) 146. Core clock gating 142 may be a technique used in many synchronous circuits for reducing dynamic power dissipation. Core at VRET 144 may refer to the core state at a retention voltage (VRET). The retention voltage may refer to the voltage required to maintain a circuit which is lower than the voltage required to operate the circuit. Core power gating 146 may refer to a technique used in circuit design to reduce power consumption, by shutting off the current to components of the circuit that are not in use.

The package idle states 118 may include but not limited to package C1/C1E 148, package C3 (PC3) 150, package C6 (PC6) 152, and package C7 (PC7) 154. Package C1 may refer to an idle state of the package where the package is halted, and no instructions are executed. Package C1E may refer to an enhancement to the C1 state with lower frequency and voltage, reducing power usage. Package C6 (PC6) 152 and Package C7 (PC7) 154 may refer to idle states of the package with even lower frequency, voltage, and power consumption.

The thread active states 122 may include but not limited to thread active states coordination 156. The thread active states coordination 156 may be used to coordinate active states of threads.

The core active states 124 may include but not limited to turbo mode (P0) 158, non-turbo modes (P1, P2, Pn) 160, and minimum frequency (Pm) mode 162. The turbo mode (P0) 158 may allow a core to run to higher active states than usual. The minimum frequency (Pm) mode 162 may limit the core to a minimum frequency.

The hardware managed active states (HWP) 128 may include but not limited to turbo mode (P0) 158, non-turbo modes (P1, P2, Pn) 160, and minimum frequency (Pm) mode 162.

The uncore frequency scaling (USF) 130 may include but not limited to turbo mode (P0) 158 and non-turbo modes (P1, P2, Pn) 160.

The core clock gating 142 may include but not limited to legacy state 164, CC1+Voltage state 166, and fast CC1 state 168. The legacy state 164 may refer to a state on an operating system which does not support ACPI. In the legacy state 164, the hardware and power are not managed via ACPI, effectively disabling ACPI.

The core at VRET (CC3) 144 may include but not limited to legacy CC3 state 170 and CC3 no cache flush state 172.

Figure 2:
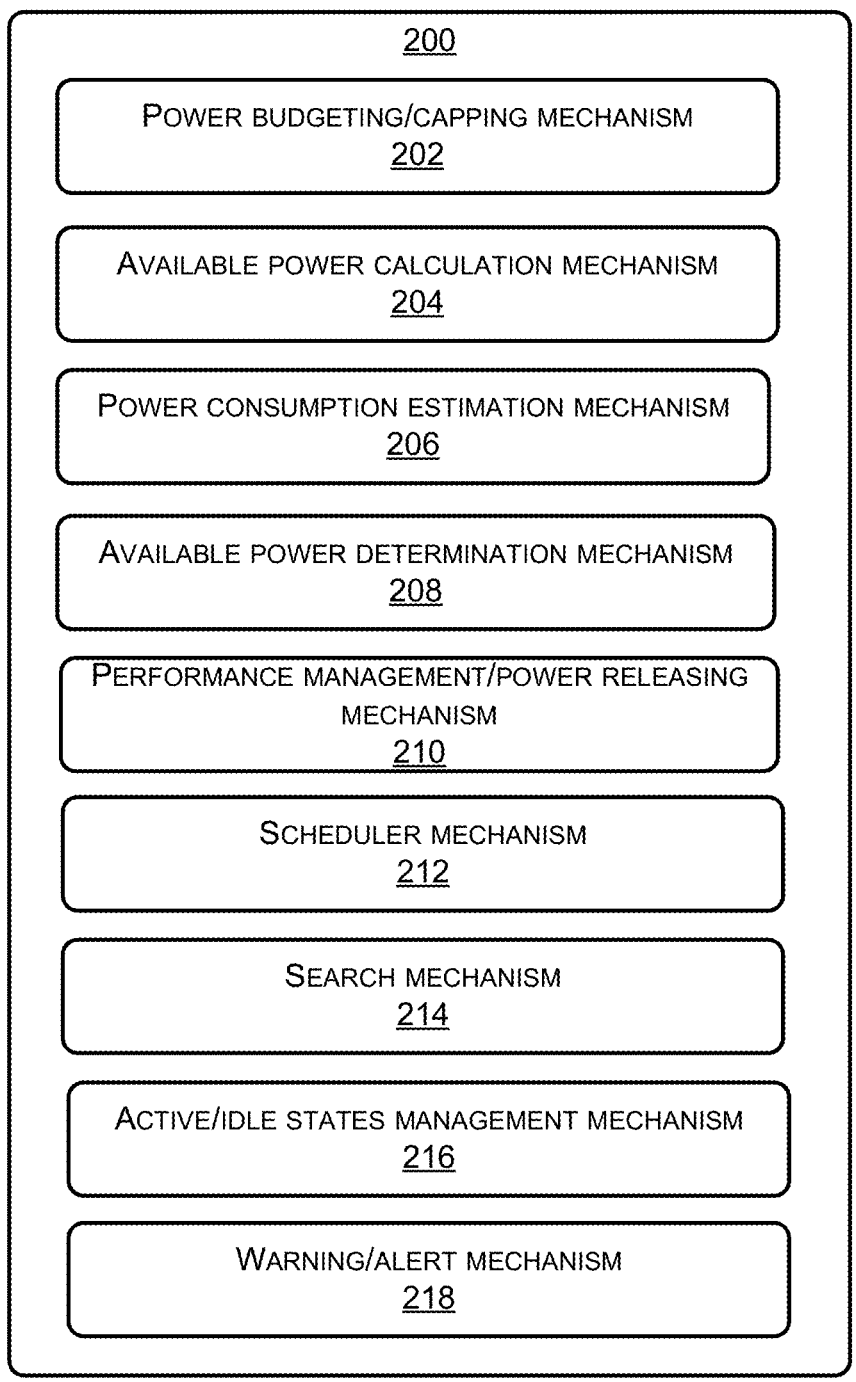
FIG. 2 illustrates an example block diagram of a system providing unified power management.

FIG. 2 illustrates an example block diagram of a system 200 providing unified power management under the hood of power budgeting/capping, where performance (denoted as frequency or any other suitable metrics) and latency (in microseconds or any other suitable metrics) of applications running on the resource may be considered. The system 200 may include the following.

A power budgeting/capping mechanism 202 may be configured to provide a power budget/cap for the resource. The power budget/cap may be represented as $P_{input}$.

The power budget/cap of resources may be determined based on different factors. Taking a mobile/ultra-mobile device (ultra-mobile is a category of midsize lightweight computing devices such as tablets, thin and lightweight computers, and so on) as an example, the power budget/cap of the mobile/ultra-mobile device may be determined based on application and/or battery life. If a user uses the mobile/ultra-mobile device to play a video which is power intensive, the power budget/cap may be set to be relatively high, for example, 300 W. If the user uses the mobile/ultra-mobile device to browse social media, which has a low power consumption, the power budget/cap may be set to be relatively low, for example, 50 W. If the user expects the battery life last for a relatively long time, for example, 10 hours, the power budget/cap may be set to be relatively low, for example, 100 W. If the user expects the battery to run for a relatively short time, for example, 5 hours, the power budget/cap may be set to be relatively high, for example, 200 W. Numbers described herein are used as examples rather than limiting the application thereto.

Taking a data center (DC) as an example, the power consumption of the DC during a certain period may have peaks and valleys. The certain period may be represented in but not limited to microseconds, seconds, minutes, hours, days, weeks, months, etc. If the power budget/cap of the DC is set to be the peak/maximum power consumption, the cost may be unaffordable. If the power budget/cap of the DC is set to be the minimum power consumption, the performance of applications running in the DC may degrade. In order to save the energy cost and to maintain the performance, the power budget/cap of the DC may be set within a certain range between the minimum and the peak/maximum power consumptions. The minimum and the peak/maximum power consumptions may be collected from but not limited to, historical data, statistical data, test data, simulation data, etc.

Taking a server as an example, the power budget/cap of the server may be set within a certain range between the minimum and the peak/maximum power consumptions. The minimum and the peak/maximum power consumptions may be collected from but not limited to, historical data, statistical data, test data, simulation data, etc. When the power consumption of the server is approaching or equal to the power budget/cap, the working load of the server may be redistributed to other servers by a scheduler. If the attempt of redistribution by the scheduler is not successful, the run time of applications on the server may be extended, such that the power consumption of the server may not exceed the power budget/cap. The applications running on the server may degrade the performance.

An available power calculation mechanism 204 may be configured to set an available power $P_{available}$ (1) of the resource to be the power budget/cap $P_{input}$ provided by the power budgeting/capping mechanism 202. That is, $P_{available}$ (1)=$P_{input}$. The available power or power budget may be associated with a user/entity. The user/entity may be a party who purchases the resource, such as a company, an organization, an institution, a household, a person, and so one.

A power consumption estimation mechanism 206 may be configured to estimate the power consumption $Power_1$ needed for the resource to support a required average performance $PERF_{avg}$ of an application. Examples of the required average performance $PERF_{avg}$ of application may be as shown in the tracking tables of FIGS. 3 and 4. The required average performance $PERF_{avg}$ of the application may be collected from, but not limited to, historical data, statistical data, test data, simulation data, specification of manufacturer, etc.

The power consumption $Power_1$ of the resource may be determined based on, but not limited to, calculation, historical data, statistical data, test data, simulation data, specification of manufacturer, etc.

Taking a CPU as an example, the CPU may have a Thermal Design Power (TDP) of 150 W at 2.5 Hz (TDP power=150 W at 2.5 GHz). The power consumption of the CPU may be calculated based on a formula (1) as below.

$$P = \text{Const} \times V^2 \times F \qquad (1)$$

In the above formula (1), P may represent the power consumption of the CPU. Const may represent a constant which may be set as necessary. V may represent the voltage applied to the CPU. F may represent the frequency at which the CPU is running.

For example, the Const may be set to be 26.67. The power consumption of the CPU at each frequency down to 1.2 GHz may be as listed in Table 1. Numbers and symbols are used as examples for the sake of description, rather than limiting the application thereto.

TABLE 1

Power consumption of CPU

| Frequency (GHz) | Voltage (Volt) | Power (W) |
|---|---|---|
| 2.5 | 1.5 | 150.00 |
| 2.4 | 1.4 | 125.44 |
| 2.3 | 1.3 | 103.65 |
| 2.2 | 1.25 | 91.67 |
| 2.1 | 1.2 | 80.64 |
| 2.0 | 1.18 | 74.26 |
| 1.9 | 1.16 | 68.18 |
| 1.8 | 1.14 | 62.38 |
| 1.7 | 1.12 | 56.87 |
| 1.6 | 1.1 | 51.63 |
| 1.5 | 1.08 | 46.66 |
| 1.4 | 1.06 | 41.95 |
| 1.3 | 1.05 | 38.22 |
| 1.2 | 1.04 | 34.61 |

The CPU is used as an example of the resource, and the application may not be limited thereto. The resource may be any element that consumes various amount of power in different states, for example, a thread, a CPU core, a package, a socket, a desktop, a mobile terminal, a laptop, a computing system, a server, a Data Center (DC), an Internet Data Center (IDC), etc.

The available power calculation mechanism 204 may be further configured to update the available power to be $P_{available}$ (2)=$P_{available}$ (1)-$Power_1$.

An available power determination mechanism 208 may be configured to determine whether the available power $P_{available}$ (2)>0.

The power consumption estimation mechanism 206 may be further configured to, if the available power $P_{available}$ (2)>0, calculate the power consumption $Power_2$ needed for the resource to support a desired maximum performance $PERF_{max}$ of the application. Additionally, or alternatively, the difference between the power consumption between these $PERF_{max}$ and $PERF_{avg}$ may be calculated to be used as $Power_2$. Examples of the desired maximum performance $PERF_{max}$ of the application may be as shown in the tracking tables of FIGS. 3 and 4. The desired maximum performance $PERF_{max}$ of the application may be determined based on, but not limited to, historical data, statistical data, test data, simulation data, specification of manufacturer, etc.

The power consumption $Power_2$ of the resource may be determined based on, but not limited to, calculation, historical data, statistical data, test data, simulation data, specification of manufacturer, etc. Taking a CPU as an example, the power consumption of the CPU may be calculated based on the formula (1) and Table 1 as described above.

The available power calculation mechanism 204 may be further configured to update the available power to be $P_{available}$ (3)=$P_{available}$ (2)-$Power_2$.

The available power determination mechanism 208 may be further configured to determine whether the available power $P_{available}$ (3)>0.

A performance management/power releasing mechanism 210 may be configured to, if the available power $P_{available}$ (3)>0, set the resource to run to support the desired maximum performance $PERF_{max}$, and return at least a part of un-used portion of the available power of the resource to a scheduler mechanism 212.

The performance management/power releasing mechanism 210 may be further configured to, if the available power $P_{available}$ (3) is not greater than 0, set the resource to support the required average performance $PERF_{avg}$ of an application, and return at least a part of un-used portion of the available power of the resource to a scheduler mechanism 212.

The scheduler mechanism 212 may be configured to schedule work load among different resources.

A search mechanism 214 may be configured to, if the available power $P_{available}$ (2) is not greater than 0, search for applications (APPs) of which the tolerated latency is higher than a predetermined threshold. The tolerated latency of APPs may be represented in μs, ms, s, etc. Examples of tolerated latency of APPs are shown in tracking tables of FIGS. 3 and 4. The threshold of tolerated latency of an application may be determined based on, but not limited to, historical data, statistical data, test data, simulation data, specification of manufacturer, etc.

An active/idle states management mechanism 216 may be configured to release a certain amount of power ($Power_3$). The active/idle states management mechanism 216 may allow the resource running the APP of which the tolerated latency is higher than the predetermined threshold to enter a lower active state than the current active state of the resource. For example, the resource may be in the first-level active state, and the active/idle states management mechanism 216 may enter the resource into the second-level active state. The active/idle states management mechanism 216 may also allow the resource running the App of which the tolerated latency is higher than the predetermined threshold to enter a lower idle state than the current idle state of the resource. For example, the resource may be in the sixth-level idle state, and the active/idle states management mechanism 216 may enter the resource into the seventh-level idle state. The active/idle states management mechanism 216 may also allow the resource running the APP of which the tolerated latency is higher than the predetermined threshold to enter an idle state from an active state. For example, the resource may be in the third-level active state, and the active/idle states management mechanism 216 may enter the resource into the first-level idle state. As a result, a certain amount of power $Power_3$ may be released.

Moreover, if more than one APPs of which the tolerated latency is higher than the predetermined threshold are found by the search mechanism 214, the active/idle states management mechanism 216 may adjust the active/idle states of resources running the APPs in a descending order of the tolerated latency of each App. For example, the active/idle states management mechanism 216 may adjust the active/idle state of the resource running an APP with the tolerated latency of 300 μs, then adjust the active/idle state of the resource running an APP with the tolerated latency of 100 μs, and then adjust the active/idle state of the resource running an APP with the tolerated latency of 10 μs, etc. Moreover, while enough power is saved or released to run the application, the active/idle states management mechanism 216 may adjust the active/idle states of some rather than all resources running APPs with the tolerated latency higher than the threshold.

The available power calculation mechanism 204 may be further configured to update the available power to be $P_{available}$ (4)=$P_{available}$ (2)+$Power_3$.

The available power determination mechanism 208 may be further configured to determine whether the available power $P_{available}$ (4)>0.

If the available power $P_{available}$ (4)>0, the power consumption estimation mechanism 206 may be further configured to calculate the power consumption $Power_2$ needed for the resource to support a desired maximum performance $PERF_{max}$ of the application as described above, for example, with reference to formula (1) and Table 1.

The search mechanism 214 may be further configured to, if the available power $P_{available}$ (4) is not greater than 0, search for APPs that require an uncore or memory frequency below a predetermined threshold. The uncore or memory frequency may refer to the frequency of the uncore parts such as cache, memory controller, and the like. The predetermined threshold may be represented by MHz, GHz, etc. The predetermined threshold and the uncore or memory frequency needed by an application may be determined based on, but not limited to, historical data, statistical data, test data, simulation data, specification of manufacturer, etc.

The active/idle states management mechanism 216 may be further configured to release a certain amount of power ($Power_4$). The active/idle states management mechanism 216 may allow the resource running the App which requires the uncore or memory frequency below a predetermined threshold to enter a lower active state than the current active state of the resource. For example, the resource may be in the first-level active state, and the active/idle states management mechanism 216 may enter the resource into the second-level active state. The active/idle states management mechanism 216 may also allow the resource running the App which requires the uncore or memory frequency below a predetermined threshold to enter a lower idle state than the current idle state of the resource. For example, the resource may be in the sixth-level idle state, and the active/idle states management mechanism 216 may enter the resource into the seventh-level idle state. The active/idle states management mechanism 216 may also allow the resource running the APP which requires the uncore or memory frequency below a predetermined threshold to enter an idle state from an active state. For example, the resource may be in the third-level active state, and the active/idle states management mechanism 216 may enter the resource into the first-level idle state. As a result, a certain amount of power $Power_4$ may be released.

Moreover, if more than one APPs which requires the uncore or memory frequency below a predetermined threshold are found by the search mechanism 214, the active/idle states management mechanism 214 may adjust the active/idle states of resources running the APPs in a descending order required uncore or memory frequency of each APP. For example, the active/idle states management mechanism 216 may adjust the active/idle state of the resource running an APP with the required uncore or memory frequency of 2.5 GHz, then adjust the active/idle state of the resource running an APP with the required uncore or memory frequency of 2.3 GHz, and then adjust the active/idle state of the resource running an APP with required uncore or memory frequency of 2.1 GHz, etc. Moreover, while enough power is saved or released to run the application, the active/idle states management mechanism 216 may adjust the active/idle states of some rather than all resources running APPs which requires the uncore or memory frequency below the predetermined threshold.

The available power calculation mechanism 204 may be further configured to update the available power to be $P_{available}$ (5)=$P_{available}$ (4)+$Power_4$.

The available power determination mechanism 208 may be further configured to determine whether the available power $P_{available}$ (5)>0.

If the available power $P_{available}$ (5)>0, the power consumption estimation mechanism 206 may be further configured to calculate the power consumption $Power_2$ needed for the resource to support a desired maximum performance $PERF_{max}$ of the application as described above.

The power consumption estimation mechanism 206 may be configured to, if the available power $P_{available}$ (5) is not greater than 0, estimate the power ($Power_5$) needed to run an accepted minimum performance $PERF_{min}$ of the application. Examples of the accepted minimum performance $PERF_{min}$ of the application may be as shown in the tracking tables of FIGS. 3 and 4. The accepted minimum performance $PERF_{min}$ of the application may be determined based on, but not limited to, historical data, statistical data, test data, simulation data, specification of manufacturer, etc.

The power consumption $Power_5$ of the resource may be determined based on, but not limited to, calculation, historical data, statistical data, test data, simulation data, specification of manufacturer, etc. Taking a CPU as an example, the power consumption of the CPU may be calculated based on the formula (1) and Table 1 as described above.

The available power calculation mechanism 204 may be further configured to update the available power $P_{available}$ (6)=$P_{available}$ (5)+$Power_1$−$Power_5$.

The available power determination mechanism 208 may be further configured to determine whether the available power $P_{available}$ (6)>0.

The performance management/power releasing mechanism 210 may be further configured to, if the available power $P_{available}$ (6)>0, set the resource to run to support the accepted minimum performance $PERF_{min}$ of the application.

A warning/alert mechanism 218 may be configured to, if the available power $P_{available}$ (6) is not greater than 0, send a warning/alert message to the scheduler mechanism 212, indicating that the available power is not enough to run the accepted minimum performance $PERF_{min}$ of the application.

The scheduler mechanism 212 may be further configured to reschedule work load among resources after receiving the warning/alert message from the warning/alert mechanism 218.

FIG. 3 illustrates a tracking table 300 for a single application/tenancy.

Referring to FIG. 3, the tracking table 300 may include the following. The column 302 may represent the power budget/cap set by the power budgeting/capping mechanism. The column 304 may represent the required average performance $PERF_{avg}$ of the application/tenancy. The column 306 may represent the accepted minimum performance $PERF_{min}$ and duration of the application/tenancy. The column 308 may represent the desired maximum performance $PERF_{max}$ of the application/tenancy. The column 310 may represent the tolerated latency of the application/tenancy. The column 312 may represent the part ID of the resource on which the application/tenancy runs. Each part ID may be associated with the resource such as cores, threads, packages, sockets, servers, data centers, and the like. The column 314 may represent the workload feature of the application/tenancy including but not limited to the number of cores, the APP ratio, the C0%, Instruction per Cycle (IPC), Double Data Rate (DDR) access latency, Input/output (IC)) bandwidth (B/W), etc. The APP ratio may be an indicator of the intensity of an application when the application is running. The APP ratio may be a number between 0 and 1. As described above, since the zero-level idle state C0 may represent the busy state of the resource, C0% may represent the utilization of the resource, i.e., the percentage of the resource that is in the zero-level idle state C0 state.

The first row 316 may represent that for a resource associated with a part ID of #185BC2, the power budget may be 90 W. The required average performance of the application/tenancy may be 2.1 GHz. The accepted minimum performance and duration of the application/tenancy may be 1.8 GHz for 20 seconds. The desired maximum performance of the application/tenancy may be 2.5 GHz. The tolerated latency of the application/tenancy may be 10 µs. The workload feature may include but not limited to 44 cores, an APP ratio of 0.55, an IPC of 1.20, a DDR access latency of 50 ns, an IO B/W of 2.7 Gb/s. Numbers and symbols described herein are used as examples rather than limiting the application thereto.

The second row 318 may represent that for a resource associated with a part ID of #187EF1, the power budget may be 105 W. The required average performance of the application/tenancy may be 2.3 GHz. The accepted minimum performance and duration of the application/tenancy may be 1.2 GHz forever. The desired maximum performance of the application/tenancy may be 3.6 GHz. The tolerated latency of the application/tenancy may be 300 µs. The workload feature may include but not limited to 44 cores, an APP ratio of 0.72, an IPC of 1.50, a DDR access latency of 96 ns, an IO B/W of 5.0 Gb/s. Numbers and symbols described herein are used as examples rather than limiting the application thereto.

The third row 230 may represent that for a resource associated with a part ID of #187EF2, the power budget may be 120 W. The required average performance of the application/tenancy may be 2.3 GHz. The accepted minimum performance and duration of the application/tenancy may be 1.2 GHz forever. The desired maximum performance of the application/tenancy may be 3.6 GHz. The tolerated latency of the application/tenancy may be 300 µs. The workload feature may include but not limited to 44 cores, an APP ratio of 0.72, an IPC of 1.50, a DDR access latency of 96 ns, an IO B/W of 5.0 Gb/s. Numbers and symbols described herein are used as examples rather than limiting the application thereto.

The fourth row 322 may represent that for a resource associated with a part ID of #165CD4, the power budget may be 130 W. The required average performance of the application/tenancy may be 2.5 GHz. The accepted minimum performance and duration of the application/tenancy may be 2.5 GHz forever. The desired maximum performance of the application/tenancy may be 2.5 GHz. The tolerated latency of the application/tenancy may be 100 µs. The workload feature may include but not limited to 32 cores, an APP ratio of 0.83, an IPC of 1.06, a DDR access latency of 122 ns, an IO B/W of 3.5 Gb/s. Numbers and symbols described herein are used as examples rather than limiting the application thereto.

With the workload feature, a power budget/cap may be defined for each resource. The power budget/cap may be the only parameter needed by the power budgeting/capping. A time window in which the power budget/cap is valid may be set. For example, the time window may be in nanoseconds, microseconds, seconds, minutes, etc. As the size of time window in which the power budget/cap is valid is reduced, the power management states may switch faster. As such, power budgeting/capping may be the only interface to developers and users, and can effectively employ active states and idle states in hardware power management.

FIG. 4 illustrates a tracking table 400 for multiple applications/tenancies. Two applications/tenancies are used as examples in the tracking table 400; however, the application may not be limited thereto. More applications/tenancies may present.

Referring to FIG. 4, the tracking table 400 may include the following. The column 402 may represent the power budget/cap set by the power budgeting/capping mechanism. The column 404 may represent the required average performance $PERF_{avg}$ per application/tenancy. The column 406 may represent the accepted minimum performance $PERF_{min}$ and duration per application/tenancy. The column 408 may represent the desired maximum performance $PERF_{max}$ per application/tenancy. The column 410 may represent the tolerated latency per application/tenancy. The column 412 may represent the part ID of the resource on which the multiple applications/tenancies run. Each part ID may be associated with the resource such as cores, threads, packages, sockets, servers, data centers, and the like. The column 414 may represent the workload feature per application/tenancy including but not limited to the number of cores, the APP ratio, the C0%, the IPC, the DDR access latency, the IO B/W, etc. The meaning of C0% may be as described above.

The first row 416 may represent that for a resource associated with a part ID of #185BC2, the power budget may be 120 W. The required average performance $PERF_{avg}$ per application/tenancy may be 2.1 GHz for a first application/tenancy and 2.1 GHz for a second application/tenancy. The accepted minimum performance $PERF_{min}$ and duration per application/tenancy may be 1.8 GHz for 20 seconds for the first application/tenancy and 1.6 GHz for 30 seconds for the second application/tenancy. The desired maximum performance $PERF_{max}$ per application/tenancy may be 2.5 GHz for the first application/tenancy and 3.0 GHz for the second application/tenancy. The tolerated latency per application/tenancy may be 10 µs for the first application/tenancy and 70 µs for the second application/tenancy. The workload feature may include but not limited to 44 cores, an APP ratio of 0.55, an IPC of 1.10, a DDR access latency of 50 ns, an IO B/W of 2.7 Gb/s for the first application/tenancy and 8 cores, an APP ratio of 0.62, an IPC of 0.94, a DDR access latency of 70 ns, an IO B/W of 0.03 Gb/s for the second application/tenancy. Numbers and symbols described herein are used as examples rather than limiting the application thereto.

The second row 418 may represent that for a resource associated with a part ID of #187EF1, the power budget may be 135 W. The required average performance $PERF_{avg}$ per application/tenancy may be 2.3 GHz for the first application/tenancy and 2.5 GHz for the second application/tenancy. The accepted minimum performance $PERF_{min}$ and duration per application/tenancy may be 1.2 GHz forever for the first application/tenancy and 1.8 GHz for 30 seconds for the second application/tenancy. The desired maximum performance $PERF_{max}$ per application/tenancy may be 3.6 GHz for the first application/tenancy and 2.5 GHz for the second application/tenancy. The tolerated latency per application/tenancy may be 300 µs for the first application/tenancy and 5 µs for the second application/tenancy. The workload feature may include but not limited to 44 cores, an APP ratio of 0.72, an IPC of 1.32, a DDR access latency of 96 ns, an IO B/W of 5.0 Gb/s for the first application/tenancy, and 4 cores, an APP ratio of 0.81, an IPC of 1.09, a DDR access latency of 52 ns, an IO B/W of 0.8 Gb/s for the second application/tenancy. Numbers and symbols described herein are used as examples rather than limiting the application thereto.

The third row 420 may represent that for a resource associated with a part ID of #187EF2, the power budget may be 150 W. The required average performance PERF$_{avg}$ per application/tenancy may be 2.3 GHz for the first application/tenancy and 2.5 GHz for the second application/tenancy. The accepted minimum performance PERF$_{min}$ and duration per application/tenancy may be 1.2 GHz forever for the first application/tenancy and 1.8 GHz for 30 seconds for the second application/tenancy. The desired maximum performance PERF$_{max}$ per application/tenancy may be 3.6 GHz for the first application/tenancy and 2.5 GHz for the second application/tenancy. The tolerated latency per application/tenancy may be 300 μs for the first application/tenancy and 10 μs for the second application/tenancy. The workload feature may include but not limited to 44 cores, an APP ratio of 0.72, an IPC of 1.32, a DDR access latency of 96 ns, an IO B/W of 5.0 Gb/s for the first application/tenancy and 4 cores, an APP ratio of 0.81, an IPC of 1.09, a DDR access latency of 52 ns, an IO B/W of 0.8 Gb/s for the second application/tenancy. Numbers and symbols described herein are used as examples rather than limiting the application thereto.

The fourth row 422 may represent that for a resource associated with a part ID of #165CD4, the power budget may be 160 W. The required average performance PERF$_{avg}$ per application/tenancy may be 2.5 GHz for the first application/tenancy and 3.8 GHz for the second application/tenancy. The accepted minimum performance PERF$_{min}$ and duration per application/tenancy may be 2.5 GHz forever for the first application/tenancy and 2.5 GHz forever for the second application/tenancy. The desired maximum performance PERF$_{max}$ per application/tenancy may be 2.5 GHz for the first application/tenancy and 3.8 GHz for the second application/tenancy. The tolerated latency per application/tenancy may be 100 μs for the first application/tenancy and 5 μs for the second application/tenancy. The workload feature may include but not limited to 32 cores, an APP ratio of 0.83, an IPC of 1.06, a DDR access latency of 122 ns, an IO B/W of 3.5 Gb/s for the first application/tenancy, and 4 cores, an APP ratio of 0.41, an IPC of 1.85, a DDR access latency of 40 ns, an IO B/W of 12 Gb/s for the second application/tenancy. Numbers and symbols described herein are used as examples rather than limiting the application thereto.

In the above tracking tables 300 and 400, The workload feature may be collected by telemetry readings. The telemetry readings may be implemented by software, hardware, firmware, or any combination thereof. The workload feature may provide a hint to choose power management parameters among various power management options.

Figure 5A:
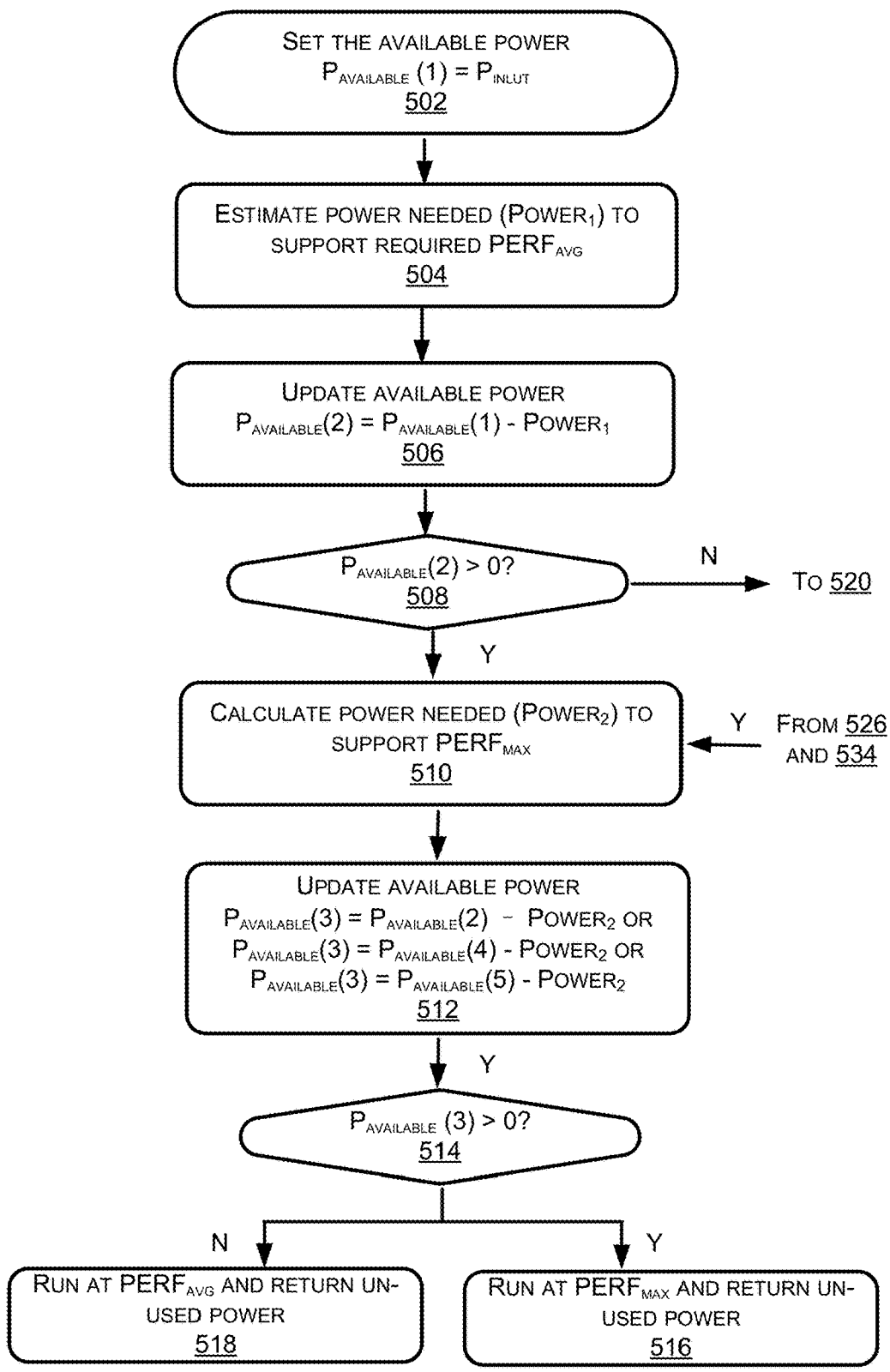
FIGS. 5A, 5B, and 5C illustrate an example flowchart of a process for providing unified power management.
Figure 5B:
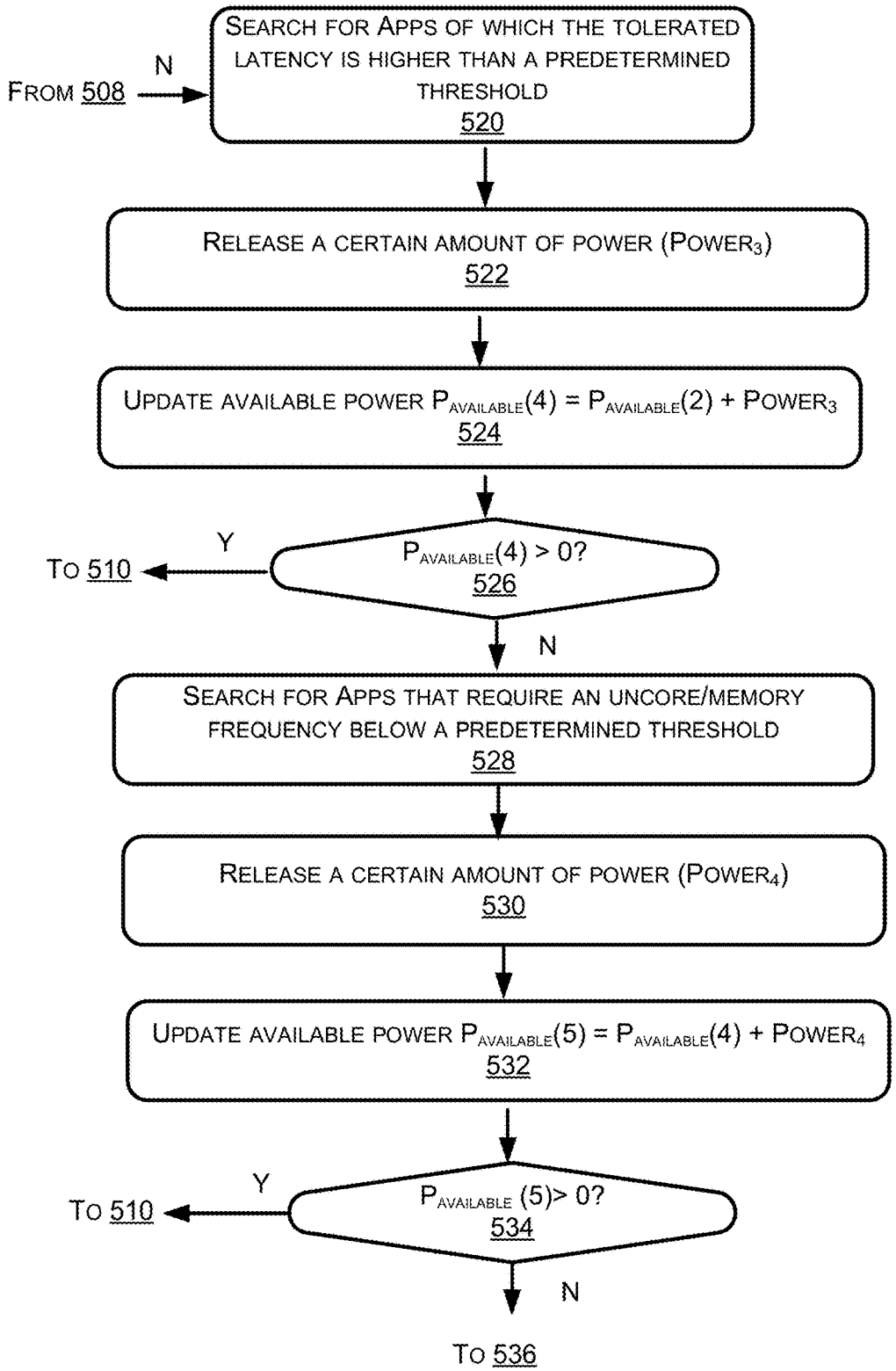
Figure 5C:
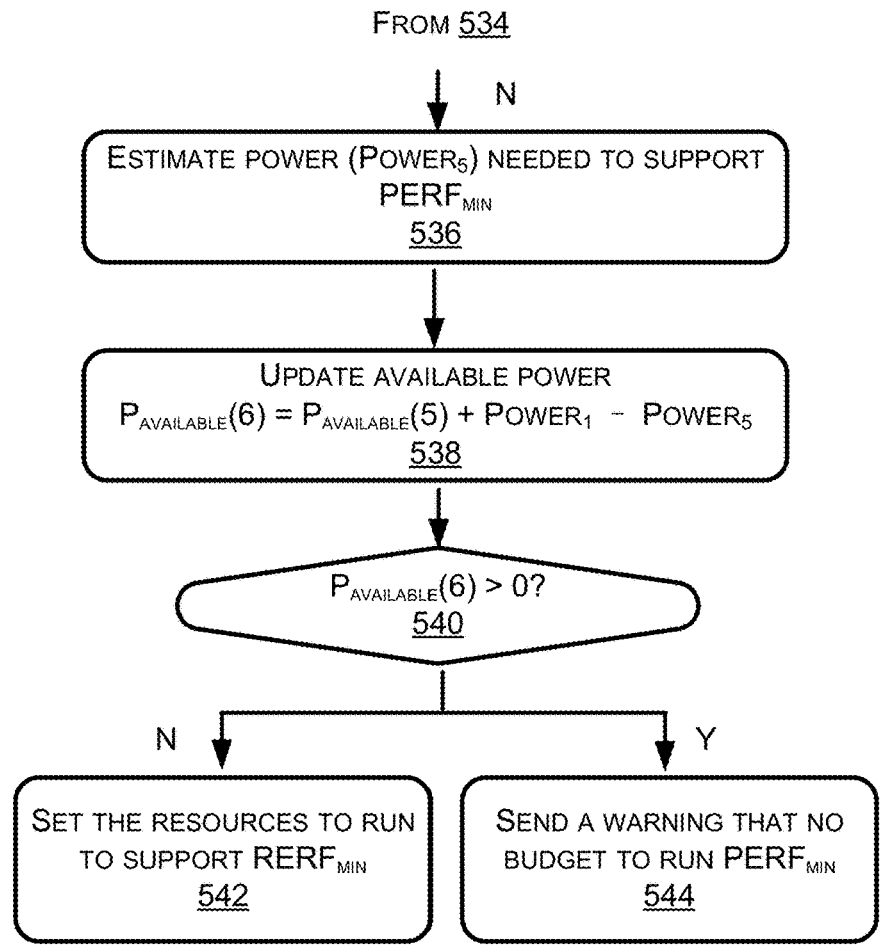

FIGS. 5A, 5B, and 5C illustrate an example flowchart of a process 500 for providing unified power management. The process 500 may include the following.

At block 502, the available power calculation mechanism 204 may set an available power P$_{available}$ (1) of the resource to be the power budget/cap P$_{input}$. That is, P$_{available}$(1)=P$_{input}$. The power budget/cap may be determined as described above with reference to FIG. 2.

At block 504, the power consumption estimation mechanism 206 may estimate the power consumption Power$_1$ needed for the resource to support a required average performance RERF$_{avg}$ of an application. The required average performance RERF$_{avg}$ may be determined as described above with reference to FIG. 2.

At block 506, the available power calculation mechanism 204 may update the available power to be P$_{available}$ (2)=P$_{available}$ (1)−Power$_1$.

At block 508, the available power determination mechanism 208 may determine whether the available power P$_{available}$ (2)>0. If the available power P$_{available}$ (2)>0, the process 500 may proceed to block 510. If the available power P$_{available}$ (2) is not greater than 0, the process 500 may proceed to block 518.

At block 510, if the available power P$_{available}$ (2)>0, or if the available power P$_{available}$ (4)>0, or if the available power P$_{available}$ (5)>0, the power consumption estimation mechanism 206 may calculate the power consumption Power$_2$ needed to support a desired maximum performance PERF$_{max}$.

At block 512, the available power calculation mechanism 204 may update the available power to be P$_{available}$ (3)=P$_{available}$ (2)−Power$_2$, if the process 500 comes from block 510; or P$_{available}$ (3)=P$_{available}$ (4)−Power$_2$, if the process 500 comes from block 524; or P$_{available}$ (3)=P$_{available}$ (5)−Power$_2$, if the process 500 comes from block 532.

At block 514, the available power determination mechanism 208 may determine whether the available power P$_{available}$ (3)>0. If the available power P$_{available}$ (3)>0, the process 500 may proceed to block 516. If the available power P$_{available}$ (3) is not greater than 0, the process 500 may proceed to block 518.

At block 516, if the available power P$_{available}$ (3)>0, the performance management/power releasing mechanism 210 may set the resource to run to support the desired maximum performance PERF$_{max}$ of the application, and may return at least part of the un-used portion of the available power of the resource to the scheduler mechanism 212.

At block 518, if the available power P$_{available}$ (3) is not greater than 0, the performance management/power releasing mechanism 210 may set the resource to run to support the required average performance PERF$_{avg}$ of the application and may return at least part of the un-used portion of the available power of the resource to the scheduler mechanism 212.

Referring to FIG. 5B, at block 520, if the available power P$_{available}$ (2) is not greater than 0, the search mechanism 214 may search for APPs of which the tolerated latency is higher than a predetermined threshold as described above with reference to FIG. 2.

At block 522, the active/idle states management mechanism 216 may release a certain amount of power (Power$_3$) by adjusting active/idle states of the resource running APPs of which the tolerated latency is higher than a predetermined threshold, which has been discussed above with reference to FIGS. 2-4.

At block 524, the available power calculation mechanism 204 may update the available power to be P$_{available}$ (4)=P$_{available}$ (2)+Power$_3$.

At block 526, the available power determination mechanism 208 may determine whether the available power P$_{available}$ (4)>0. If the available power P$_{available}$ (4)>0, the process 500 may proceed to block 510. If the available power P$_{available}$ (4) is not greater than 0, the process 500 may proceed to block 528.

At block 528, if the available power P$_{available}$ (4) is not greater than 0, the search mechanism 214 may search for APPs that require an uncore or memory frequency below a predetermined threshold as discussed above with reference to FIG. 2.

At block 530, the active/idle states management mechanism 216 may release a certain amount of power (Power$_4$) by adjusting active/idle states of the resource running APPS which require the uncore or memory frequency below a predetermined threshold, which has been discussed above with reference to FIGS. 2-4.

At block 532, the available power calculation mechanism 204 may update the available power to be $P_{available}$ (5)=$P_{available}$ (4)+$Power_4$.

At block 534, the available power determination mechanism 208 may determine whether the available power $P_{available}$ (5)>0. If the available power $P_{available}$ (5)>0, the process 500 may proceed to block 510. If the available power $P_{available}$ (5) is not greater than 0, the process 500 may proceed to block 536.

Referring to FIG. 5C, at block 536, the power consumption estimation mechanism 206 may estimate the power ($Power_5$) needed to run an accepted minimum performance $PERF_{min}$ of the application, which has been discussed above with reference to FIGS. 2-4.

At block 538, the available power calculation mechanism 204 may update the available power $P_{available}$ (6)=$P_{available}$ (5)+$Power_1$−$Power_5$.

At block 540, the available power determination mechanism 208 may determine whether the available power $P_{available}$ (6)>0. If the available power $P_{available}$ (6)>0, the process 500 may proceed to block 542. If the available power $P_{available}$ (6) is not greater than 0, the process 500 may proceed to block 544.

At block 542, if the available power $P_{available}$ (6)>0, the performance management/power releasing mechanism 210 may set the resource to run to support the accepted minimum performance $PERF_{min}$ of the application.

At block 544, the warning/alert mechanism 218 may send a warning/alert message to the scheduler mechanism 212, indicating that the available power is not enough to run the accepted minimum performance $PERF_{min}$ of the application.

Figure 6A:
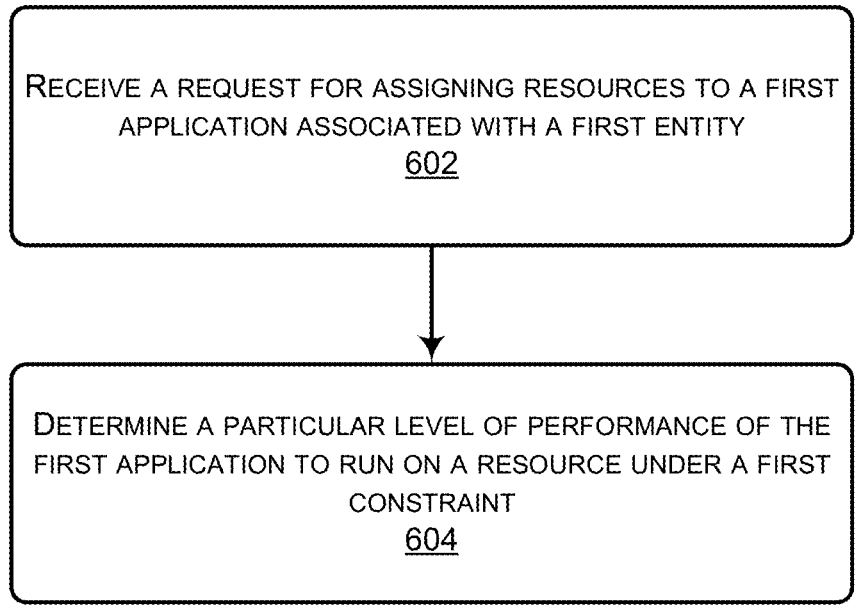
FIGS. 6A and 6B illustrate another example flowchart of a process for providing unified power management.
Figure 6B:
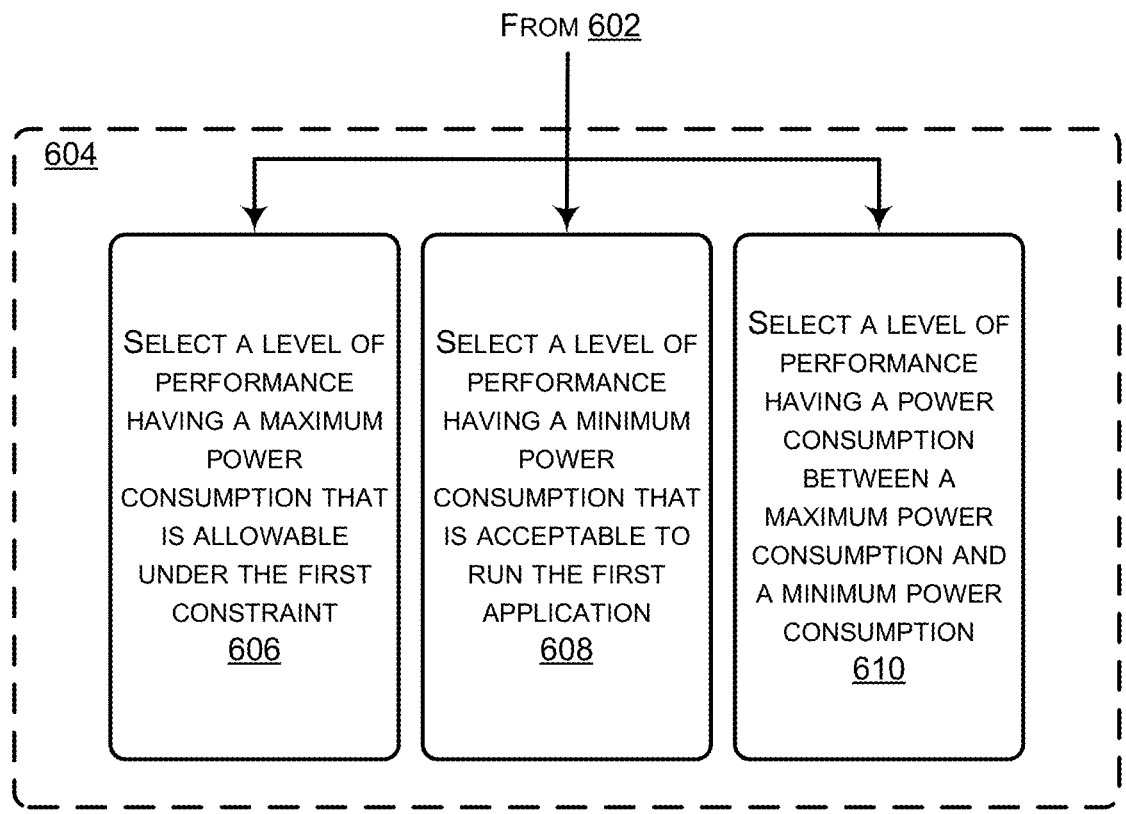

FIGS. 6A and 6B illustrate another example flowchart of a process 600 for providing unified power management.

Referring to FIG. 6A, the process 600 may include the following.

At block 602, a request for assigning resources to a first application associated with a first entity is received. The first entity may be a party who purchases the resource, such as a company, an organization, an institution, a household, a person, and so one. The first application may have a plurality of levels of performance each corresponding to a different power consumption. The power consumptions of the one or more other resources may be determined by a plurality of active states and/or a plurality of idle states of the one or more other resources, which have been discussed above with reference to FIGS. 2-5. The plurality of active states and/or the plurality of idle states of the one or more other resources may be determined by tolerated latencies of the one or more other applications, which has been discussed above with reference to FIGS. 2-5. Additionally, or alternatively, the plurality of active states and/or the plurality of idle states of the one or more other resources may be determined by required uncore/memory frequencies of the one or more other applications, which has been discussed above with reference to FIGS. 2-5.

At block 604, a particular level of performance of the first application is determined to run on a resource under a first constraint. The first constraint may indicate a sum of a power consumption of the first application running at the particular level of performance and power consumptions of one or more other resources running other applications associated with the first entity is less than or equal to a power budget associated with the first entity, which has been discussed above with reference to FIGS. 2-5.

Referring to FIG. 6B, block 604 may include the following.

At block 606, a level of performance having a maximum power consumption that is allowable under the first constraint may be selected, which has been discussed above with reference to FIGS. 2-5.

At block 608, a level of performance having a minimum power consumption that is acceptable to run the first application may be selected, which has been discussed above with reference to FIGS. 2-5.

At block 610, a level of performance having a power consumption between a maximum power consumption and a minimum power consumption may be selected, which has been discussed above with reference to FIGS. 2-5.

Figure 7:
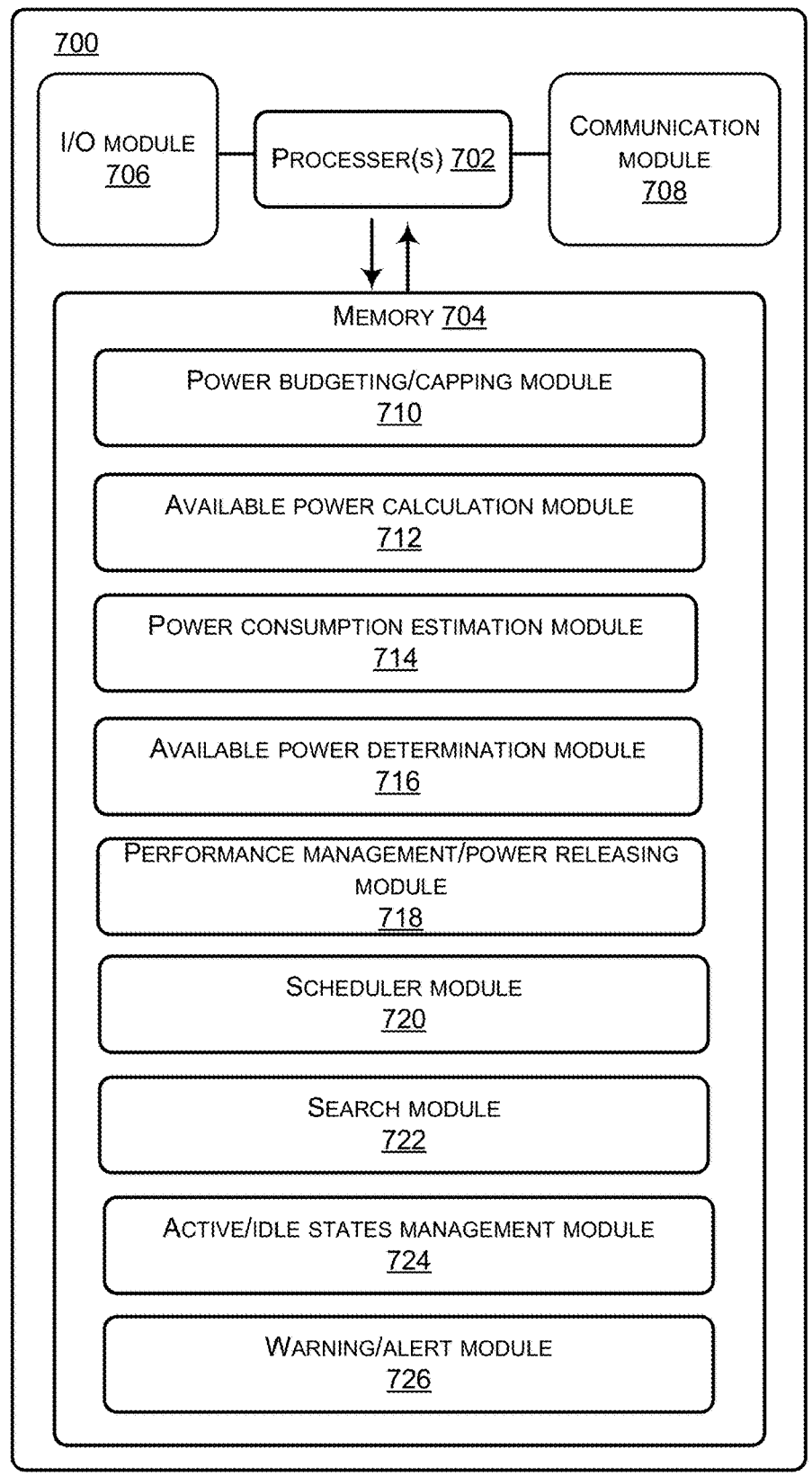
FIG. 7 illustrates an example apparatus for implementing the processes and methods described above with reference to FIGS. 1-6.

FIG. 7 illustrate an example apparatus 700 for implementing the processes and methods described above with reference to FIGS. 1-6.

The techniques and mechanisms described herein may be implemented by multiple instances of the apparatus 700 as well as by any other computing device, system, and/or environment. The apparatus 700 shown in FIG. 7 is only one example of an apparatus and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The apparatus 700 may include one or more processor(s) 702 and system memory 704 communicatively coupled to the processor(s) 702. The processor(s) 702 may execute one or more modules and/or processes to cause the processor(s) 702 to perform a variety of functions. In some embodiments, the processor(s) 702 may include a central processing unit (CPU), a graphics processing unit (GPU), both CPU and GPU, or other processing units or components known in the art. Additionally, each of the processor(s) 702 may possess its own local memory, which also may store program modules, program data, and/or one or more operating systems.

Depending on the exact configuration and type of the apparatus 700, the system memory 704 may be volatile, such as RAM, non-volatile, such as ROM, flash memory, miniature hard drive, memory card, and the like, or some combination thereof. The system memory 704 may include one or more computer-executable modules (modules) that are executable by the processor(s) 702.

The apparatus 700 may additionally include an input/output (I/O) interface 706 for receiving data. The apparatus 700 may also include a communication module 708 allowing the apparatus 700 to communicate with other devices (not shown) over a network (not shown). The network may include the Internet, wired media such as a wired network or direct-wired connections, and wireless media such as acoustic, radio frequency (RF), infrared, and other wireless media.

The memory 704 may include the following.

A power budgeting/capping module 710 may be configured to receive a request for assigning resources to a first application associated with a first entity. The first entity may be a party who purchases the resource, such as a company, an organization, an institution, a household, a person, and so one. The first application may have a plurality of levels of performance each corresponding to a different power consumption. The power consumptions of the one or more other resources may be determined by a plurality of active states and/or a plurality of idle states of the one or more other resources, which have been discussed above with reference to FIGS. 2-6. The plurality of active states and/or the plurality of idle states of the one or more other resources may be determined by tolerated latencies of the one or more other applications, which has been discussed above with reference to FIGS. 2-6. Additionally, or alternatively, the plurality of active states and/or the plurality of idle states of the one or more other resources may be determined by required uncore/memory frequencies of the one or more other applications, which has been discussed above with reference to FIGS. 2-6.

The power budgeting/capping module 710 may be further configured to provide a power budget/cap for the resource to run the first application in response to the request from the first entity. The power budget may be represented as $P_{input}$ which may be determined as described above with reference to FIGS. 2-6.

An available power calculation module 712 may be configured to set an available power $P_{available}$ (1) of the resource to be the power budget/cap $P_{input}$ provided by the power budgeting/capping module 710. That is, $P_{available}$ (1)=$P_{input}$.

A power consumption estimation module 714 may be configured to estimate the power consumption $Power_1$ needed for the resource to support a required average performance $RERF_{avg}$ of an application, which has been discussed above with reference to FIGS. 2-6.

An available power determination module 716 may be configured to determine whether the available power $P_{available}$ (2)>0.

The power consumption estimation module 714 may be further configured to, if the available power $P_{available}$ (2)>0, calculate the power consumption $Power_2$ needed for the resource to support a desired maximum performance $PERF_{max}$ of the application, which has been discussed above with reference to FIGS. 2-6.

The available power calculation module 712 may be further configured to update the available power to be $P_{available}$ (3)=$P_{available}$ (2)–$Power_2$.

The available power determination module 716 may be further configured to determine whether the available power $P_{available}$ (3)>0.

A performance management/power releasing module 718 may be configured to determine a particular level of performance of the first application to run on the resource under a first constraint. The first constraint may indicate a sum of a power consumption of the first application running at the particular level of performance and power consumptions of one or more other resources running other applications associated with the first entity is less than or equal to a power budget associated with the first entity, which has been discussed above with reference to FIGS. 2-6.

The performance management/power releasing module 718 may be further configured to, if the available power $P_{available}$ (3)>0, set the resource to run to support the desired maximum performance $PERF_{max}$, and return at least a part of un-used portion of the available power of the resource to a scheduler module 720. The desired maximum performance $PERF_{max}$ may be a level of performance having a maximum power consumption that is allowable under the first constraint, which has been discussed above with reference to FIGS. 2-6.

The performance management/power releasing module 718 may be further configured to, if the available power $P_{available}$ (3) is not greater than 0, set the resource to run to support the required average performance $PERF_{avg}$ of an application, and return at least a part of un-used portion of the available power of the resource to a scheduler module 720. The required average performance $PERF_{avg}$ of the application may be a level of performance having a power consumption between a maximum power consumption and a minimum power consumption, which has been discussed above with reference to FIGS. 2-6.

The scheduler module 720 may be configured to schedule work load among different resources.

A search module 722 may be configured to, if the available power $P_{available}$ (2) is not greater than 0, search for APPs of which the tolerated latency is higher than a predetermined threshold as discussed above with reference to FIGS. 2-6.

The active/idle states management module 724 may be configured to release a certain amount of power ($Power_3$) as discussed above with reference to FIGS. 2-6.

The available power calculation module 712 may be further configured to update the available power to be $P_{available}$ (4)=$P_{available}$ (2)+$Power_3$.

The available power determination module 716 may be further configured to determine whether the available power $P_{available}$ (4)>0.

If the available power $P_{available}$ (4)>0, the power consumption estimation module 714 may be further configured to calculate the power consumption $Power_2$ needed for the resource to support a desired maximum performance $PERF_{max}$ of the application as described above with reference to FIGS. 2-6.

The search module 722 may be further configured to, if the available power $P_{available}$ (4) is not greater than 0, search for APPs that require an uncore or memory frequency below a predetermined threshold as discussed above with reference to FIGS. 2-6.

The active/idle states management module 724 may be further configured to release a certain amount of power ($Power_4$) as discussed above with reference to FIGS. 2-6.

The available power calculation module 712 may be further configured to update the available power to be $P_{available}$ (5)=$P_{available}$ (4)+$Power_4$.

The available power determination module 716 may be further configured to determine whether the available power $P_{available}$ (5)>0.

If the available power $P_{available}$ (5)>0, the power consumption estimation module 714 may be further configured to calculate the power consumption $Power_2$ needed for the resource to support a desired maximum performance $PERF_{max}$ of the application as described above with reference to FIGS. 2-6.

The power consumption estimation module 714 may be configured to, if the available power $P_{available}$ (5) is not greater than 0, estimate the power consumption $Power_5$ needed to run an accepted minimum performance $PERF_{min}$ of the application as discussed above with reference to FIGS. 2-6. The accepted minimum performance $PERF_{min}$ may be a level of performance having a minimum power consumption that is acceptable to run the first application, which has been discussed above with reference to FIGS. 2-6.

The available power calculation module 712 may be further configured to update the available power $P_{available}$ (6)=$P_{available}$ (5)+$Power_1$−$Power_5$.

The available power determination module 716 may be further configured to determine whether the available power $P_{available}$ (6)>0.

The performance management/power releasing module 718 may be further configured to, if the available power $P_{available}$ (6)>0, set the resource to run to support the accepted minimum performance $PERF_{min}$ of the application.

A warning/alert module 726 may be configured to, if the available power $P_{available}$ (6) is not greater than 0, send a warning/alert message to the scheduler module 720, indicating that the available power is not enough to run the accepted minimum performance $PERF_{min}$ of the application.

The scheduler module 720 may be further configured to reschedule work load among resources after receiving the warning/alert message from the warning/alert module 726.

Systems and processes discussed herein may provide a way to unify different power management mechanisms under the hood of power budgeting/capping. Conflicts between different power control mechanisms may be avoided, and power efficiency may be improved. The power management may be significantly simplified.

Additionally or alternatively, under the hood of power budgeting/capping, other specific control methods may also be used.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-7. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Example Clauses

Clause 1. A method comprising: receiving a request for assigning resources to a first application associated with a first entity, the first application having a plurality of levels of performance each corresponding to a different power consumption; and determining a particular level of performance of the first application to run on a resource under a first constraint that a sum of a power consumption of the first application running at the particular level of performance and power consumptions of one or more other resources running other applications associated with the first entity is less than or equal to a power budget associated with the first entity.

Clause 2. The method of clause 1, wherein determining the particular level of performance of the first application comprises selecting a level of performance having a maximum power consumption that is allowable under the first constraint.

Clause 3. The method of clause 1, wherein determining the particular level of performance of the first application comprises selecting a level of performance having a minimum power consumption that is acceptable to run the first application.

Clause 4. The method of clause 1, wherein determining the particular level of performance of the first application comprises selecting a level of performance having a power consumption between a maximum power consumption and a minimum power consumption.

Clause 5. The method of clause 1, wherein the power consumptions of the one or more other resources are determined by a plurality of active states and/or a plurality of idle states of the one or more other resources.

Clause 6. The method of clause 5, wherein the plurality of active states and/or the plurality of idle states of the one or more other resources are determined by tolerated latencies of the one or more other applications.

Clause 7. The method of clause 5, wherein the plurality of active states and/or the plurality of idle states of the one or more other resources are determined by required uncore/memory frequencies of the one or more other applications.

Clause 8. A computer-readable storage medium storing computer-readable instructions executable by one or more processors, that when executed by the one or more processors, cause the one or more processors to perform acts comprising: receiving a request for assigning resources to a first application associated with a first entity, the first application having a plurality of levels of performance each corresponding to a different power consumption; and determining a particular level of performance of the first application to run on a resource under a first constraint that a sum of a power consumption of the first application running at the particular level of performance and power consumptions of one or more other resources running other applications associated with the first entity is less than or equal to a power budget associated with the first entity.

Clause 9. The computer-readable storage medium of clause 8, wherein determining the particular level of performance of the first application comprises selecting a level of performance having a maximum power consumption that is allowable under the first constraint.

Clause 10. The computer-readable storage medium of clause 8, wherein determining the particular level of performance of the first application comprises selecting a level of performance having a minimum power consumption that is acceptable to run the first application.

Clause 11. The computer-readable storage medium of clause 8, wherein determining the particular level of performance of the first application comprises selecting a level of performance having a power consumption between a maximum power consumption and a minimum power consumption.

Clause 12. The computer-readable storage medium of clause 8, wherein the power consumptions of the one or more other resources are determined by a plurality of active states and/or a plurality of idle states of the one or more other resources.

Clause 13. The computer-readable storage medium of clause 12, wherein the plurality of active states and/or the plurality of idle states of the one or more other resources are determined by tolerated latencies of the one or more other applications.

Clause 14. The computer-readable storage medium of clause 12, wherein the plurality of active states and/or the plurality of idle states of the one or more other resources are determined by required uncore/memory frequencies of the one or more other applications.

Clause 15. An apparatus comprising: one or more processors; and memory communicatively coupled to the one or more processors, the memory storing computer-executable modules executable by the one or more processors, the computer-executable modules including: a power capping module configured to receive a request for assigning resources to a first application associated with a first entity, the first application having a plurality of levels of performance each corresponding to a different power consumption; and a performance management module configured to determine a particular level of performance of the first application to run on a resource under a first constraint that a sum of a power consumption of the first application running at the particular level of performance and power consumptions of one or more other resources running other applications associated with the first entity is less than or equal to a power budget associated with the first entity.

Clause 16. The system of clause 15, wherein the performance management module is further configured to select a level of performance having a maximum power consumption that is allowable under the first constraint.

Clause 17. The system of clause 15, wherein the performance management module is further configured to select a level of performance having a minimum power consumption that is acceptable to run the first application.

Clause 18 The system of clause 15, wherein determining the particular level of performance of the first application comprises selecting a level of performance having a power consumption between a maximum power consumption and a minimum power consumption.

Clause 19. The system of clause 15, wherein the power consumptions of the one or more other resources are determined by a plurality of active states and/or a plurality of idle states of the one or more other resources.

Clause 20. The system of clause 18, wherein the plurality of active states and/or the plurality of idle states of the one or more other resources are determined by tolerated latencies of the one or more other applications.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving a request for assigning resources to a first application associated with a first entity, the first application having a plurality of levels of performance, each corresponding to a different power consumption;
determining power consumptions of one or more other resources by a plurality of idle states of the one or more other resources based on a number of interrupts and tolerated latencies of other applications running on the one or more other resources respectively, the other applications including a second application and a third application, the second application having a smaller number of interrupts than that of the third application, a resource running the second application having a lower idle state than that of another resource running the third application, the lower idle state indicating a longer time for the resource to exit the idle state than the another resource;
determining that tolerated latencies of multiple applications in the other applications are higher than a predetermined threshold;
adjusting idle states of resources running the multiple applications in a descending order of a tolerated latency of each application of the multiple applications;
determining a particular level of performance of the first application to run on a resource under a first constraint that a sum of a power consumption of the first application running at the particular level of performance and the power consumptions of the one or more other resources running the other applications associated with the first entity is less than or equal to a power budget associated with the first entity; and
updating an available power of the first application based on the particular level of performance.

2. The method of claim 1, wherein the determining the particular level of performance of the first application comprises selecting a level of performance having a maximum power consumption that is allowable under the first constraint.

3. The method of claim 1, wherein the determining the particular level of performance of the first application comprises selecting a level of performance having a minimum power consumption that is acceptable to run the first application.

4. The method of claim 1, wherein the determining the particular level of performance of the first application comprises selecting a level of performance having a power consumption between a maximum power consumption and a minimum power consumption.

5. The method of claim 1, wherein the power consumptions of the one or more other resources are further determined by a plurality of active states of the one or more other resources.

6. The method of claim 5, wherein the plurality of active states and/or the plurality of idle states of the one or more other resources are determined by tolerated latencies of one or more other applications.

7. The method of claim 5, wherein the plurality of active states and/or the plurality of idle states of the one or more other resources are determined by required uncore or memory frequencies of one or more other applications.

8. A computer-readable storage medium storing computer-readable instructions executable by one or more processors, that when executed by the one or more processors, cause the one or more processors to perform acts comprising:
receiving a request for assigning resources to a first application associated with a first entity, the first application having a plurality of levels of performance, each corresponding to a different power consumption;
determining power consumptions of one or more other resources by a plurality of idle states of the one or more other resources based on a number of interrupts and tolerated latencies of other applications running on the one or more other resources respectively, the other applications including a second application and a third application, the second application having a smaller number of interrupts than that of the third application, a resource running the second application having a lower idle state than that of another resource running the third application, the lower idle state indicating a longer time for the resource to exit the idle state than the another resource;
determining that tolerated latencies of multiple applications in the other applications are higher than a predetermined threshold;
adjusting idle states of resources running the multiple applications in a descending order of a tolerated latency of each application of the multiple applications;
determining a particular level of performance of the first application to run on a resource under a first constraint that a sum of a power consumption of the first application running at the particular level of performance and the power consumptions of the one or more other resources running the other applications associated with the first entity is less than or equal to a power budget associated with the first entity; and
updating an available power of the first application based on the particular level of performance.

9. The computer-readable storage medium of claim 8, wherein the determining the particular level of performance of the first application comprises selecting a level of performance having a maximum power consumption that is allowable under the first constraint.

10. The computer-readable storage medium of claim 8, wherein the determining the particular level of performance of the first application comprises selecting a level of performance having a minimum power consumption that is acceptable to run the first application.

11. The computer-readable storage medium of claim 8, wherein the determining the particular level of performance of the first application comprises selecting a level of performance having a power consumption between a maximum power consumption and a minimum power consumption.

12. The computer-readable storage medium of claim 8, wherein the power consumptions of the one or more other resources are further determined by a plurality of active states of the one or more other resources.

13. The computer-readable storage medium of claim 12, wherein the plurality of active states and/or the plurality of idle states of the one or more other resources are determined by tolerated latencies of one or more other applications.

14. The computer-readable storage medium of claim 12, wherein the plurality of active states and/or the plurality of idle states of the one or more other resources are determined by required uncore or memory frequencies of one or more other applications.

15. An apparatus comprising:
one or more processors; and
memory communicatively coupled to the one or more processors, the memory storing computer-readable instructions executable by the one or more processors, that when executed by the one or more processors, cause the one or more processors to perform acts including:
receiving a request for assigning resources to a first application associated with a first entity, the first application having a plurality of levels of performance each corresponding to a different power consumption;
determining power consumptions of one or more other resources by a plurality of idle states of the one or more other resources based on a number of interrupts and tolerated latencies of other applications running on the one or more other resources respectively, the other applications including a second application and a third application, the second application having a smaller number of interrupts than that of the third application, a resource running the second application having a lower idle state than that of another resource running the third application, the lower idle state indicating a longer time for the resource to exit the idle state than the another resource;
determining that tolerated latencies of multiple applications in the other applications are higher than a predetermined threshold;
adjusting idle states of resources running the multiple applications in a descending order of a tolerated latency of each application of the multiple applications;
determining a particular level of performance of the first application to run on a resource under a first constraint that a sum of a power consumption of the first application running at the particular level of performance and the power consumptions of the one or more other resources running the other applications associated with the first entity is less than or equal to a power budget associated with the first entity; and
updating an available power of the first application based on the particular level of performance.

16. The apparatus of claim 15, wherein the determining the particular level of performance of the first application comprises selecting a level of performance having a maximum power consumption that is allowable under the first constraint.

17. The apparatus of claim 15, wherein the determining the particular level of performance of the first application comprises selecting a level of performance having a minimum power consumption that is acceptable to run the first application.

18. The apparatus of claim 15, wherein the determining the particular level of performance of the first application comprises selecting a level of performance having a power consumption between a maximum power consumption and a minimum power consumption.

19. The apparatus of claim 15, wherein the power consumptions of the one or more other resources are further determined by a plurality of active states of the one or more other resources.

20. The apparatus of claim 19, wherein the plurality of active states and/or the plurality of idle states of the one or more other resources are determined by tolerated latencies of one or more other applications.

\* \* \* \* \*